US008786719B2

(12) United States Patent
Chao et al.

(10) Patent No.: US 8,786,719 B2
(45) Date of Patent: Jul. 22, 2014

(54) IMAGE CALIBRATION METHOD AND OPERATION METHOD FOR SENSOR ARRAY MODULE WITH WIDE ANGLE

(71) Applicant: Pixart Imaging Inc., Hsin-Chu County (TW)

(72) Inventors: Tzu Yi Chao, Hsin-Chu (TW); Hsin Chia Chen, Hsin-Chu (TW); Chih Hsin Lin, Hsin-Chu (TW); Ren Hau Gu, Hsin-Chu (TW); Chang Che Tsai, Hsin-Chu (TW)

(73) Assignee: Pixart Imaging Inc., Hsin-Chu (TW)

( * ) Notice: Subject to any disclaimer, the term of this patent is extended or adjusted under 35 U.S.C. 154(b) by 0 days.

(21) Appl. No.: 13/761,623

(22) Filed: Feb. 7, 2013

(65) Prior Publication Data

US 2013/0147909 A1   Jun. 13, 2013

Related U.S. Application Data

(62) Division of application No. 12/506,714, filed on Jul. 21, 2009, now Pat. No. 8,384,789.

(30) Foreign Application Priority Data

Jul. 23, 2008   (TW) ................................ 97127886 A

(51) Int. Cl.
*H04N 5/225*       (2006.01)
*H04N 7/00*        (2011.01)
*H04N 17/00*       (2006.01)
*H04N 5/232*       (2006.01)

(52) U.S. Cl.
CPC .......... *H04N 17/002* (2013.01); *H04N 5/23238* (2013.01)
USPC ......................................... 348/218.1; 348/36

(58) Field of Classification Search
CPC ................................................... H04N 5/23238
USPC ....................................................... 348/218.1
See application file for complete search history.

(56) References Cited

U.S. PATENT DOCUMENTS

| 6,677,982 | B1 | 1/2004 | Chen et al. | |
| 7,084,904 | B2 * | 8/2006 | Liu et al. | 348/218.1 |
| 7,307,654 | B2 * | 12/2007 | Chang | 348/218.1 |
| 7,764,309 | B2 * | 7/2010 | Deguchi | 348/218.1 |
| 2005/0025313 | A1 | 2/2005 | Wachtel et al. | |
| 2006/0125921 | A1 | 6/2006 | Foote | |

* cited by examiner

*Primary Examiner* — Ahmed A Berhan
(74) *Attorney, Agent, or Firm* — Lowe Hauptman & Ham, LLP

(57) ABSTRACT

A sensor array module with wide angle for creating a composite image includes a first image sensor, a second image sensor, a storage unit and a processor. The first image sensor is for capturing a first image. The second image sensor is for capturing a second image and has a relative spatial relationship with respective to the first image sensor. The storage unit stores at least one transformation matrix obtained according to the relative spatial relationship between the first and the second image sensors. The processor combines the first image and the second image by using the transformation matrix to create the composite image. The present invention also provides an image calibration method, an operation method and an application for a sensor array module with wide angle.

8 Claims, 11 Drawing Sheets

IMAGE CALIBRATION METHOD AND OPERATION METHOD FOR SENSOR ARRAY MODULE WITH WIDE ANGLE

CROSS REFERENCE TO RELATED APPLICATION

This application is a divisional application of U.S. application Ser. No. 12/506,714, filed Jul. 21, 2009, which claims the priority benefit of Taiwan Patent Application Serial Number 097127886, filed on Jul. 23, 2008, the full disclosure of the above-listed applications is incorporated herein by reference.

BACKGROUND

1. Field of the Invention

This invention generally relates to an image sensor and, more particularly, to a sensor array module with wide angle, and an image calibration method, an operation method and an application for the same.

2. Description of the Related Art

In conventional technologies, the field of view of an image sensor can be increased by using a wide-angle lens or a fisheye lens, but theses lenses usually have higher cost. Therefore, methods to reduce the cost by combining a plurality of general image sensors to create a wide field of view have been proposed. For example, U.S. Patent Publication Number 2005/0025313 discloses an imaging system, entitled "Digital imaging system for creating a wide-angle image from multiple narrow angle images", including a plurality of imaging devices. The imaging devices are positioned such that the field of view of each imaging device overlaps that of each adjacent imaging device. The digital imaging system further includes a control module for simultaneously actuating each of the imaging devices to capturing an image with the field of view of all devices concurrently, and the resulting images from each of the image devices are merged to create a wide-angle image.

In this manner, how to combine multiple images to create a wide-angle image has become an important issue. This invention provides a sensor array module with wide angle which combines multiple images by using at least one transformation matrix, wherein the transformation matrix is a relative spatial relationship between individual imaging devices and is pre-stored in the sensor array module. In addition, if the relative spatial relationship between imaging devices can be known in advance, the field of view of each imaging device may not overlap with that of each adjacent imaging device, such that a composite field of view of the sensor array module can be further increased.

SUMMARY

The present invention provides a sensor array module with wide angle which utilizes at least two general image sensors to increase the field of view of the sensor array module, such that an expensive special camera lens may not be used so as to effectively reduce the cost of the module.

The present invention further provides an image calibration method for a sensor array module with wide angle, and the calibration method calculates, in advance, at least one transformation matrix according to a relative spatial relationship between at least two image sensors. In addition, when the relative spatial relationship between image sensors is already known, the field of view of each image sensor may not overlap with that of each adjacent image sensor so as to increase the total field of view.

The present invention further provides an operation method for a sensor array module with wide angle, and the operation method utilizes a transformation matrix pre-stored in the sensor array module to correctly combine a plurality of images so as to create a wide angle image.

The present invention further provides an application for a sensor array module with wide angle, wherein the sensor array module is applied in a pointer positioning system so as to increase the field of view of the pointer positioning system and to decrease the system cost.

The present invention provides a sensor array module with wide angle for creating a composite image. The sensor array module with wide angle includes a first image sensor, a second image sensor, a storage unit and a processor. The first image sensor is for capturing a first image. The second image sensor is for capturing a second image and has a relative spatial relationship with respect to the first image sensor. The storage unit stores at least one transformation matrix, wherein the transformation matrix is obtained according to the relative spatial relationship between the first image sensor and the second image sensor. The processor combines the first image and the second image by using the transformation matrix to create the composite image.

According to another aspect of the present invention, the present invention further provides an image calibration method for a sensor array module with wide angle which includes a first image sensor and a second image sensor. The image calibration method includes the following steps: providing at least three reference points, wherein the reference points define a reference coordinate system and each reference point has a reference coordinate; capturing a first image including at least three reference points with the first image sensor, wherein the first image defines a first image coordinate system and each reference point included in the first image has a first image coordinate; obtaining a first transformation matrix according to the reference coordinate system and the first image coordinate system; capturing a second image including at least three reference points with the second image sensor, wherein the second image defines a second image coordinate system and each reference point included in the second image has a second image coordinate; obtaining a second transformation matrix according to the reference coordinate system and the second image coordinate system; and transforming the first image and/or the second image to a virtual plane by using the first transformation matrix and/or the second transformation matrix.

According to another aspect of the present invention, the present invention further provides an image calibration method for a sensor array module with wide angle which includes a first image sensor and a second image sensor. The image calibration method includes following steps: determining a relative spatial relationship between the first image sensor and the second image sensor; obtaining at least one transformation matrix according to the relative spatial relationship; and transforming images captured by the first image sensor and/or images captured by the second image sensor to a virtual plane by using the transformation matrix.

According to another aspect of the present invention, the present invention further provides an operation method for a sensor array module with wide angle which includes a first image sensor, a second image sensor and a storage unit storing at least one transformation matrix obtained according to a relative spatial relationship between the first image sensor and the second image sensor. The operation method includes following steps: capturing a third image with the first image sensor; capturing a fourth image with the second image sensor; transforming the third image and/or the fourth image to a virtual plane by using the transformation matrix; capturing at least one characteristic parameter of object images in the virtual plane; and transmitting the characteristic parameter to an image display device or a storage device.

According to another aspect of the present invention, the present invention further provides an operation method for a sensor array module with wide angle which includes a first image sensor, a second image sensor and a storage unit storing at least one transformation matrix obtained according to a relative spatial relationship between the first image sensor and the second image sensor. The operation method includes following steps: capturing a third image with the first image sensor; generating a first characteristic parameter according to the third image; capturing a fourth image with the second image sensor; generating a second characteristic parameter according to the fourth image; transforming the first characteristic parameter and the second characteristic parameter to a virtual plane by using the transformation matrix whereby combining the first characteristic parameter and the second characteristic parameter; and transmitting the characteristic parameter to an image display device or a storage device.

According to another aspect of the present invention, the present invention further provides a pointer positioning system including at least one light source, a sensor array module with wide angle and an image display device. The sensor array module is for creating a composite image with a composite field of view. The sensor array module includes a first image sensor for capturing a first image, a second image sensor for capturing a second image and having a relative spatial relationship with respect to the first image sensor, and an image processing unit storing a transformation matrix and combining the first image and the second image to create the composite image by using the transformation matrix, wherein the first image and/or the second image include an image of the light source and the transformation matrix is obtained according to the relative spatial relationship between the first image sensor and the second image sensor, and the image processing unit generating a characteristic parameter based on the composite image and the image of the light source. The image display device is coupled to the sensor array module for displaying a picture generated from an application, and controlling the application and updating the picture based on the characteristic parameter.

According to another aspect of the present invention, the present invention further provides a pointer positioning system including at least one light source, a sensor array module with wide angle and an image display device. The sensor array module is for creating a composite image with a composite field of view. The sensor array module includes a first image sensor for capturing a third image; a second image sensor for capturing a fourth image and having a relative spatial relationship with respect to the first image sensor; and an image processing unit generating a first characteristic parameter from the third image and generating a second characteristic parameter from the fourth image, and creating the composite characteristic parameters from the first characteristic parameter and the second characteristic parameter by using a transformation matrix, wherein at least one of the first characteristic parameter and the second characteristic parameter is determined from an image of the light source in the third image or the fourth image, and wherein the transformation matrix is obtained according to the relative spatial relationship between the first image sensor and the second image sensor. The image display device is coupled to the sensor array module for displaying a picture generated from an application, and controlling the application and updating the picture based on the composite characteristic parameters.

The sensor array module with wide angle and its operation method and applications of the present invention utilize at least one transformation matrix, which is calculated in advance in a calibration mode, to combine a plurality of images to increase a total field of view of the sensor array module so as to increase the practicability. In addition, because a special camera lens will not be used in the sensor array module with wide angle of the present invention, the total cost can be reduced.

BRIEF DESCRIPTION OF THE DRAWINGS

Other objects, advantages, and novel features of the present invention will become more apparent from the following detailed description when taken in conjunction with the accompanying drawings.

FIG. 4b shows a top view of the operational schematic diagram of the calibration mode of the sensor array module with wide angle shown in FIG. 4a.

FIG. 6b shows a schematic diagram of the coordinate transformation of reference point images between different coordinate systems shown in FIG. 6a.

FIG. 7b shows a schematic diagram of the coordinate transformation of reference point images between different coordinate systems shown in FIG. 7a.

FIG. 8b shows a top view of the operational schematic diagram of the calibration mode of the sensor array module with wide angle shown in FIG. 8a.

FIG. 9a shows a schematic diagram of reference point images based on the reference coordinate system defined by the reference points shown in FIG. 8a.

FIG. 9b shows a schematic diagram of reference point images based on the first image coordinate system defined by the first image sensor shown in FIG. 8a.

FIG. 9c shows a schematic diagram of reference point images based on the second image coordinate system defined by the second image sensor shown in FIG. 8a.

FIG. 11b shows an image captured by the first image sensor of the sensor array module with wide angle shown in FIG. 11a.

FIG. 11c shows an image captured by the second image sensor of the sensor array module with wide angle shown in FIG. 11a.

FIG. 11d shows a composite image captured by the sensor array module with wide angle shown in FIG. 11a.

DETAILED DESCRIPTION OF THE EMBODIMENT

It should be noticed that, wherever possible, the same reference numbers will be used throughout the drawings to refer to the same or like parts.

Figure 1A:
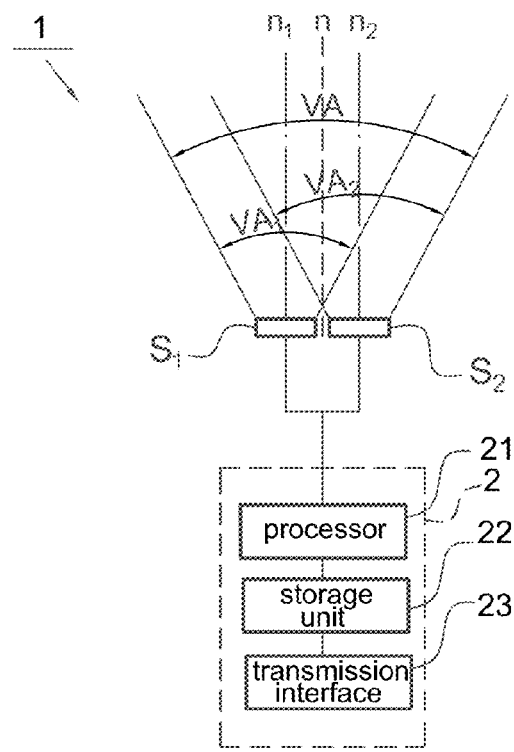
FIG. 1a shows a schematic diagram of the sensor array module with wide angle according to one embodiment of the present invention.
Figure 1B:
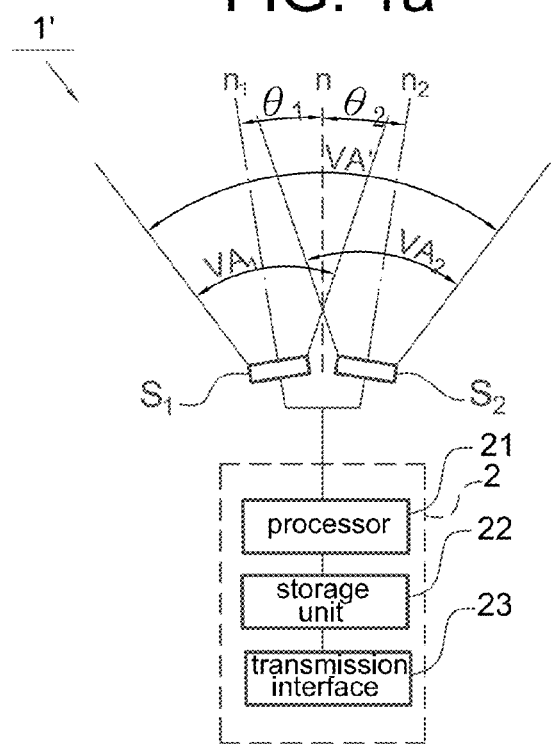
FIG. 1b shows another schematic diagram of the sensor array module with wide angle according to one embodiment of the present invention.

Please refer to FIGS. 1a and 1b, they respectively show a schematic diagram of the sensor array module with wide angle 1 and 1' according to one embodiment of the present invention. The sensor array module with wide angle 1 and 1' include a first image sensor $S_1$, a second image sensor $S_2$ and an image processing unit 2 which includes a processor 21, a storage unit 22 and a transmission interface unit 23. In addition, the sensor array module with wide angle 1 and 1' may further include a plurality of lenses or a lens set (not shown) respectively disposed in front of the first image sensor $S_1$ and the second image sensor $S_2$ to increase the sensing efficiency thereof. The image processing unit 2 may further include a power supply unit (not shown) for providing the necessary power of the sensor array module with wide angle 1 and 1' during operation.

Embodiments of the first image sensor $S_1$ and the second image sensor $S_2$ include, but not limited to, a CCD image sensor and a CMOS image sensor. The first image sensor $S_1$ is for capturing images and has a first field of view $VA_1$. The second image sensor $S_2$ is for capturing images and has a second field of view $VA_2$. The sensor array module with wide angle 1 and 1' are for capturing composite images and have a composite field of view VA and VA'. The composite field of views VA and VA' are formed by combining the first field of view $VA_1$ and the second field of view $VA_2$; therefore, $VA(VA') \geq VA_1$ and $VA(VA') \geq VA_2$. In addition, although only two image sensors are used in this embodiment, the sensor array module with wide angle 1 and 1' may have more than two image sensors according to different applications.

Please refer to FIG. 1a again, in the sensor array module with wide angle 1, the first image sensor $S_1$ and the second image sensor $S_2$ are disposed parallely with each other; that is, there is no angle difference between a central normal $n_1$ of the first field of view $VA_1$ of the first image sensor $S_1$, a central normal $n_2$ of the second field of view $VA_2$ of the second image sensor $S_2$ and a central normal of the composite field of view VA. The first image sensor $S_1$ and the second image sensor $S_2$ are coupled to the image processing unit 2. The processor 21 of the image processing unit 2 is for processing images captured by the first image sensor $S_1$ and the second image sensor $S_2$, e.g. performing image calibration, image combination, characteristic capturing, distortion compensation, etc. The storage unit 22 is for storing images captured by the first image sensor $S_1$ and the second image sensor $S_2$ and/or images processed by the processor 21. The storage unit 22 stores a plurality of parameters, e.g. a spatial distance between the first image sensor $S_1$ and the second image sensor $S_2$ and an angle θ (θ=0° in FIG. 1a) between the central normals $n_1$, $n_2$ and n, such that the processor 21 can use the parameters to process the images captured by the first image sensor $S_1$ and the second image sensor $S_2$. The transmission interface unit 23 transmits the images captured by the sensor array module with wide angle 1 and 1' to an image display device (not shown) for displaying or a storage device for storing. The present invention utilizes the image processing unit 2 to process and combine images captured by the first image sensor $S_1$ and the second image sensor $S_2$, such that the sensor array module with wide angle 1 can have a wider composite field of view VA.

Please refer to FIG. 1b again, the sensor array module with wide angle 1' is an alternative embodiment of the sensor array module with wide angle 1, wherein there is an angle difference θ=$θ_1$+$θ_2$ between the first image sensor $S_1$ and the second image sensor $S_2$; that is, there is a first angle difference $θ_1$ between the central normal $n_1$ of the first field of view $VA_1$ and the central normal of the composite field of view VA, and a second angle difference $θ_2$ between the central normal $n_2$ of the second field of view $VA_2$ and the central normal of the composite field of view VA, wherein the first angle difference $θ_1$ may be equal to or different from the second angle difference $θ_2$. In this embodiment, various parameters of a relative spatial relationship between the first image sensor $S_1$ and the second image sensor $S_2$, e.g. a spatial distance between the first image sensor $S_1$ and the second image sensor $S_2$, the first angle difference $θ_1$, the second angle difference $θ_2$, and a transformation matrix obtained according to aforementioned parameters, are stored in the storage unit 22. The processor 21 uses the transformation matrix to create a virtual plane. In this alternative embodiment, the image processing unit 2 also processes and combines images captured by the first image sensor $S_1$ and the second image sensor $S_2$, such that the sensor array module with wide angle 1' can have a wider composite field of view VA', wherein VA'>VA. In addition, the sensor array module with wide angle 1 and 1' of the present invention can be applied in a pointer positioning system, such as the positioning of a light gun's sight in a shooting game or the positioning of a pointing device, so as to reduce the field of view limitation of the pointer positioning system.

Figure 2:
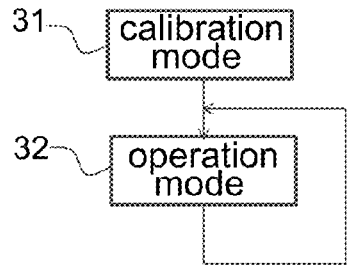
FIG. 2 shows a flow chart of the operation method of the sensor array module with wide angle according to one embodiment of the present invention.

Please refer to FIG. 2, it shows a flow chart of an operation method of the sensor array module with wide angle 1 and 1' of one embodiment of the present invention, and the operation method includes a calibration mode 31 and an operation mode 32. The calibration mode 31 is performed before the sensor array module 1 and 1' leave the factory or when they are used for the first time for obtaining various parameters of the relative spatial relationship between the first image sensor $S_1$ and the second image sensor $S_2$ to obtain a transformation matrix between two images according to those parameters and to obtain a virtual plane. The operation mode 32 includes the steps of transforming images captured by the first image sensor $S_1$ and the second image sensor $S_2$ to the virtual plane and capturing object characteristics in the captured images. Detailed descriptions of the calibration mode 31 and the operation mode 32 will be illustrated in the following paragraphs.

Figure 3:
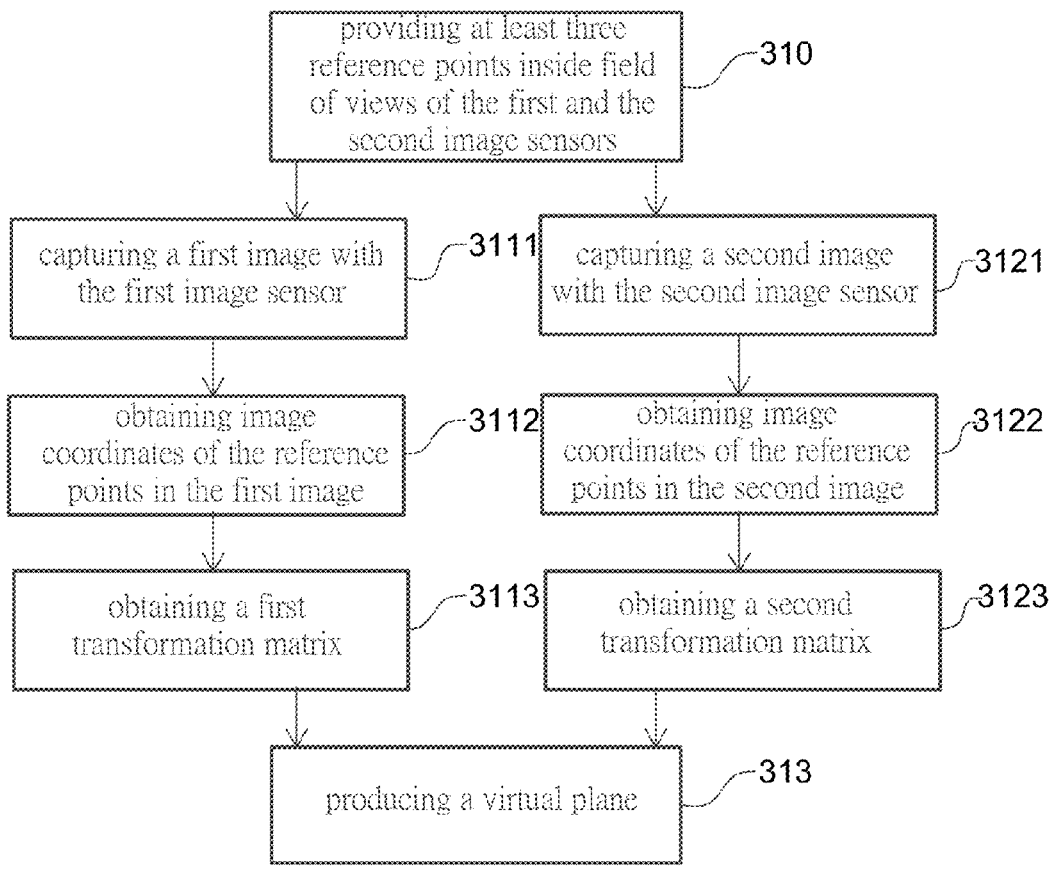
FIG. 3 shows a flow chart of the calibration mode of the sensor array module with wide angle according to one embodiment of the present invention.

Please refer to FIG. 3, it shows a flow chart of the calibration mode 31 according to one embodiment of the preset invention, and the calibration mode 31 includes the following steps: providing at least three reference points inside field of views of the first image sensor and the second sensor, wherein the reference points define a reference coordinate system (step 310); capturing a first image with the first image sensor, which defines a first image coordinate system (step 3111); obtaining image coordinates of the reference points in the first image (step 3112); obtaining a first transformation matrix according to a relative spatial relationship between the reference coordinate system and the first image coordinate system (step 3113); capturing a second image with the second image sensor, which defines a second image coordinate system (step 3121); obtaining image coordinates of the reference points in the second image (step 3122); obtaining a second transformation matrix according to a relative spatial relationship between the reference coordinate system and the second image coordinate system (step 3123); transforming the first image to a virtual plane by using the first transformation matrix and/or transforming the second image to the virtual plane by using the second transformation matrix (step 313).

Figure 4A:
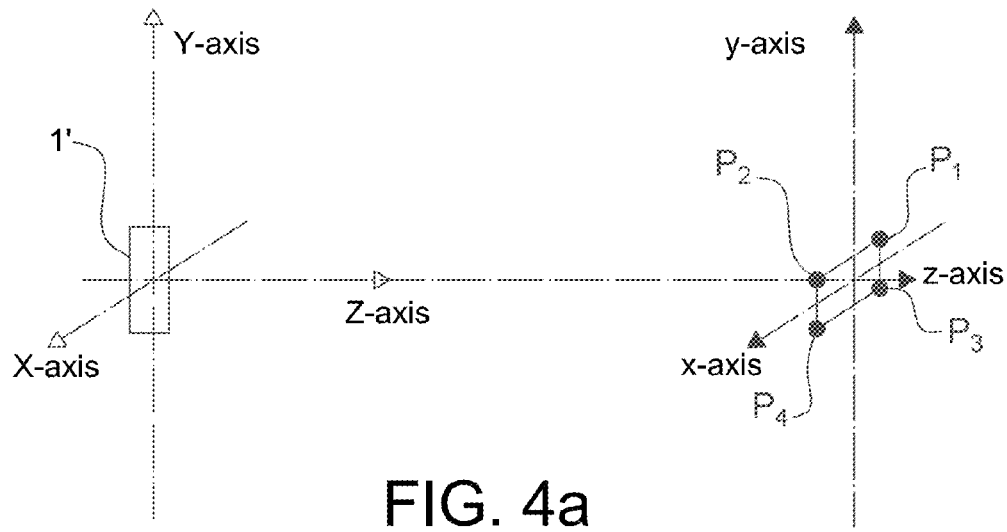
FIG. 4a shows an operational schematic diagram of the calibration mode of the sensor array module with wide angle according to one embodiment of the present invention.
Figure 4B:
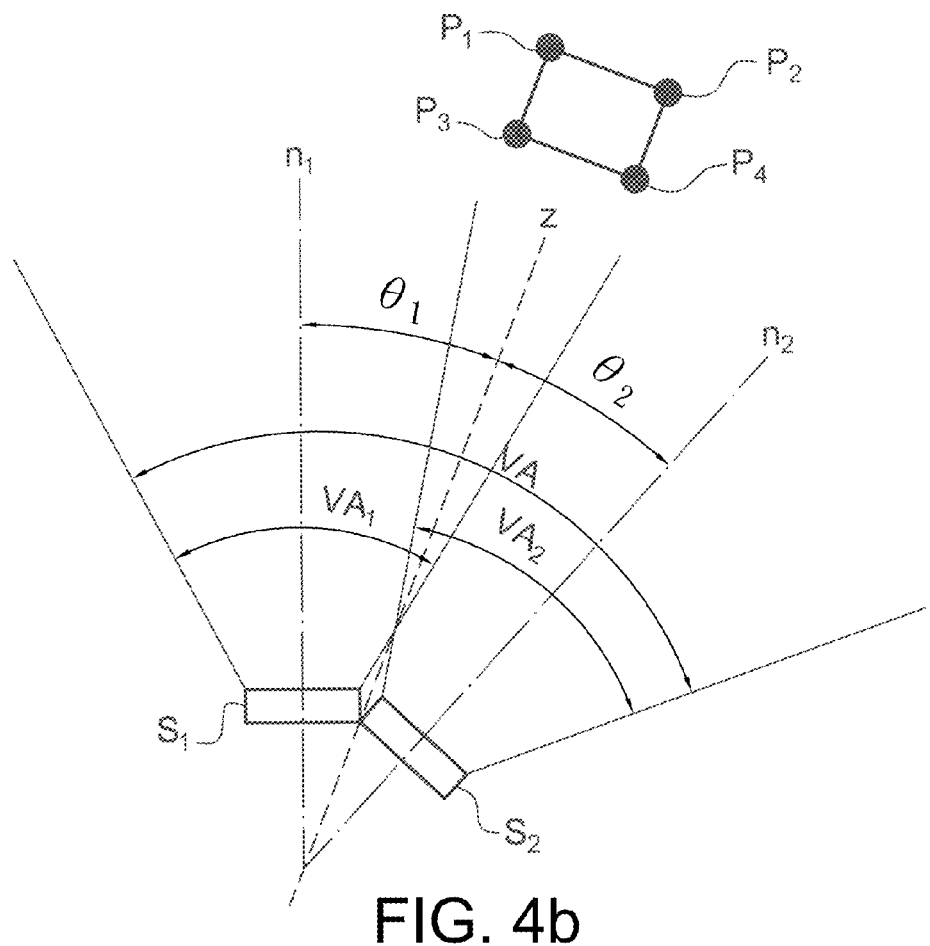

Please refer to FIGS. 4a and 4b, FIG. 4a shows one exemplary embodiment of the calibration mode 31 of the present invention; FIG. 4b shows a top view of FIG. 4a. In this exemplary embodiment, the sensor array module with wide angle 1 and 1' capture images of four reference points $P_1 \sim P_4$ in space to be served as calibration parameters, wherein embodiments of the reference points $P_1 \sim P_4$ include infrared LEDs and infrared laser diodes, and the reference points $P_1 \sim P_4$ are located inside an overlap region of the first field of view $VA_1$ and the second field of view $VA_2$ (step 310). The reference points $P_1 \sim P_4$ define a reference coordinate system including x, y, z axes. The sensor array module with wide angle 1' captures images according to a coordinate system including X, Y, Z axes, and the first image sensor and the second image sensor respectively define their own image coordinate systems, e.g. the first image sensor defines a first image coordinate system including $X_1, Y_1, Z_1$ axes; the second image sensor defines a second image coordinate system including $X_2, Y_2, Z_2$ axes. In this exemplary embodiment, there is a transverse angle difference between the first image sensor $S_1$ and the second image sensor $S_2$ but there is no longitudinal angle difference therebetween. For example, a first angle difference $\theta_1 = -\Phi$ exists between the central normal $n_1(X_1, 0, Z_1)$ of the first image sensor $S_1$ and the z-axis of the reference coordinate system defined by the reference points $P_1 \sim P_4$; a second angle difference $\theta_2 = \Phi$ exists between the central normal $n_2(X_2, 0, Z_2)$ of the second image sensor $S_2$ and the z-axis of the reference coordinate system defined by the reference points $P_1 \sim P_4$ (FIG. 4b).

Figure 5A:
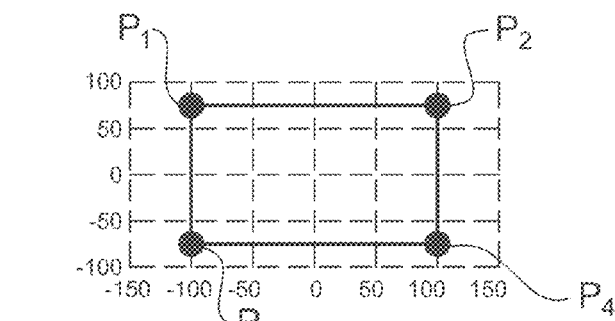
FIG. 5a shows a schematic diagram of reference point images based on the reference coordinate system defined by the reference points.
Figure 5B:
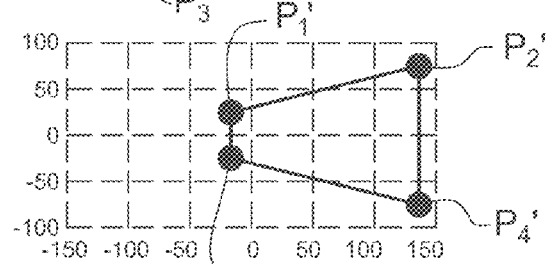
FIG. 5b shows a schematic diagram of reference point images based on the first image coordinate system defined by the first image sensor.

FIG. 5a shows reference point images based on the reference coordinate system defined by the reference points $P_1 \sim P_4$. FIG. 5b shows reference point images $P_1' \sim P_4'$ captured by the first image sensor $S_1$ (first image) based on the first image coordinate system (step 3111), and coordinates of each reference point image in the first image can be obtained (step 3112). Using coordinate transformation, a transformation matrix $H_1$ between the reference coordinate system and the first image coordinate system can be obtained as equation (1) (step 3113):

$$H_1 = \begin{bmatrix} \cos(-\Phi) & 0 & -\sin(-\Phi) \\ 0 & 1 & 0 \\ \sin(-\Phi) & 0 & \cos(-\Phi) \end{bmatrix} \quad (1)$$

That is, when coordinates of the reference point images based on the reference coordinate system defined by the reference points $P_1 \sim P_4$ are already known to be (x, y, z), the coordinates (x, y, z) can be transformed to coordinates based on the first image coordinate system defined by the first image sensor $S_1$ by using the transformation matrix $H_1$ as equation (2):

$$H_1 \times \begin{bmatrix} x \\ y \\ z \end{bmatrix} = \begin{bmatrix} x\cos(-\Phi) - z\sin(-\Phi) \\ y \\ x\sin(-\Phi) + z\cos(-\Phi) \end{bmatrix} \quad (2)$$

Figure 5C:
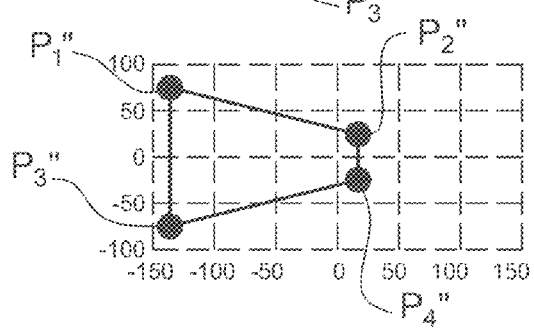
FIG. 5c shows a schematic diagram of reference point images based on the second image coordinate system defined by the second image sensor.

Similarly, FIG. 5c shows reference point images $P_1'' \sim P_4''$ captured by the second image sensor $S_2$ (second image) based on the second image coordinate system (step 3121), and coordinates of each reference point image in the second image can be obtained (step 3122). Using coordinate transformation, a transformation matrix $H_2$ between the reference coordinate system and the second image coordinate system can be obtained as equation (3) (step 3123):

$$H_2 = \begin{bmatrix} \cos(\Phi) & 0 & -\sin(\Phi) \\ 0 & 1 & 0 \\ \sin(\Phi) & 0 & \cos(\Phi) \end{bmatrix} \quad (3)$$

That is, when coordinates of the reference point images based on the reference coordinate system defined by the reference points $P_1 \sim P_4$ are already known to be (x, y, z), the coordinates (x, y, z) can be transformed to coordinates based on the second image coordinate system defined by the second image sensor $S_2$ by using the transformation matrix $H_2$ as equation (4):

$$H_2 \times \begin{bmatrix} x \\ y \\ z \end{bmatrix} = \begin{bmatrix} x\cos(\Phi) - z\sin(\Phi) \\ y \\ x\sin(\Phi) + z\cos(\Phi) \end{bmatrix} \quad (4)$$

Obtained transformation matrices $H_1$ and $H_2$ described above represent the relative spatial relationship between the first image sensor $S_1$ and the second image sensor $S_2$. Finally, the first image is transformed to a virtual plane by using the first transformation matrix $H_1$ and/or the second image is transformed to the virtual plane by using the second transformation matrix $H_2$ (step 313), wherein the virtual plane can be based on the reference coordinate system defined by the reference points $P_1 \sim P_4$ (i.e. the first image and the second image are respectively transformed to the reference coordinate system through the transformation matrix); can be based on the first image coordinate system defined by the first image $S_1$ (i.e. the second image is transformed to the first image coordinate system through the transformation matrix); or can be based on the second image coordinate system defined by the second image $S_2$ (i.e. the first image is transformed to the second image coordinate system through the transformation matrix).

In addition, when the relative spatial relationship between image sensors is not known, the first transformation matrix $H_1$ can still be obtained according to equation (2) by using coordinates of the reference point images $P_1'\sim P_4'$ captured by the first image sensor $S_1$ and predefined coordinates of the reference point images $P_1\sim P_4$, e.g. (x, y, z). Similarly, the second transformation matrix $H_2$ can also be obtained according to equation (4) by using coordinates of the reference point images $P_1''\sim P_4''$ captured by the second image sensor $S_2$ and predefined coordinates of the reference point images $P_1\sim P_4$.

Figure 5D:
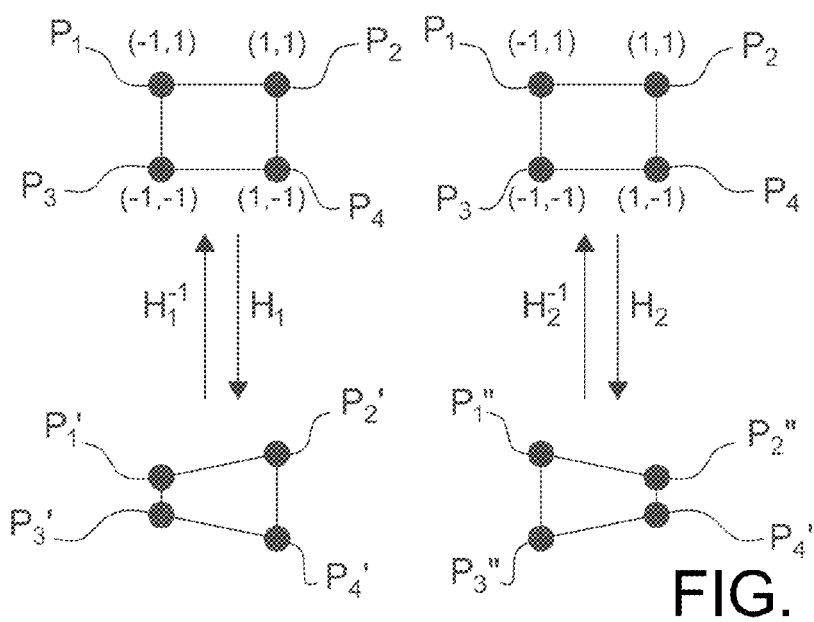
FIG. 5d shows a schematic diagram of the coordinate transformation of reference point images between different coordinate systems.

Please refer to FIG. 5d, it shows an embodiment in which the first image and the second image are transformed to the virtual plane through transformation matrices. For example, if captured images are based on the reference coordinate system defined by the reference points $P_1\sim P_4$, coordinates of the reference point images are $P_1=(-1,1)$, $P_2=(1,1)$, $P_3=(-1,-1)$ and $P_4=(1,-1)$. If a relative spatial relationship between image sensors is already known (already know the transformation matrix), those coordinates can be transformed to a coordinate system based on the first image coordinate system through the transformation matrix $H_1$ (left-bottom diagram in FIG. 5d) or can be transformed to a coordinate system based on the second image coordinate system through the transformation matrix $H_2$ (right-bottom diagram in FIG. 5d). In addition, if captured images are based on the first image coordinate system, the reference point images $P_1''\sim P_4''$ can be transformed to the virtual plane, which is based on the first image coordinate system, by using twice transformation matrices and will be corresponding to the reference point images $P_1'\sim P_4'$ after transformation. Similarly, if captured images are based on the second image coordinate system, the reference point images $P_1'\sim P_4'$ can be transformed to the virtual plane, which is based on the second image coordinate system, by using twice transformation matrices and will be corresponding to the reference point images $P_1''\sim P_4''$.

Figure 6A:
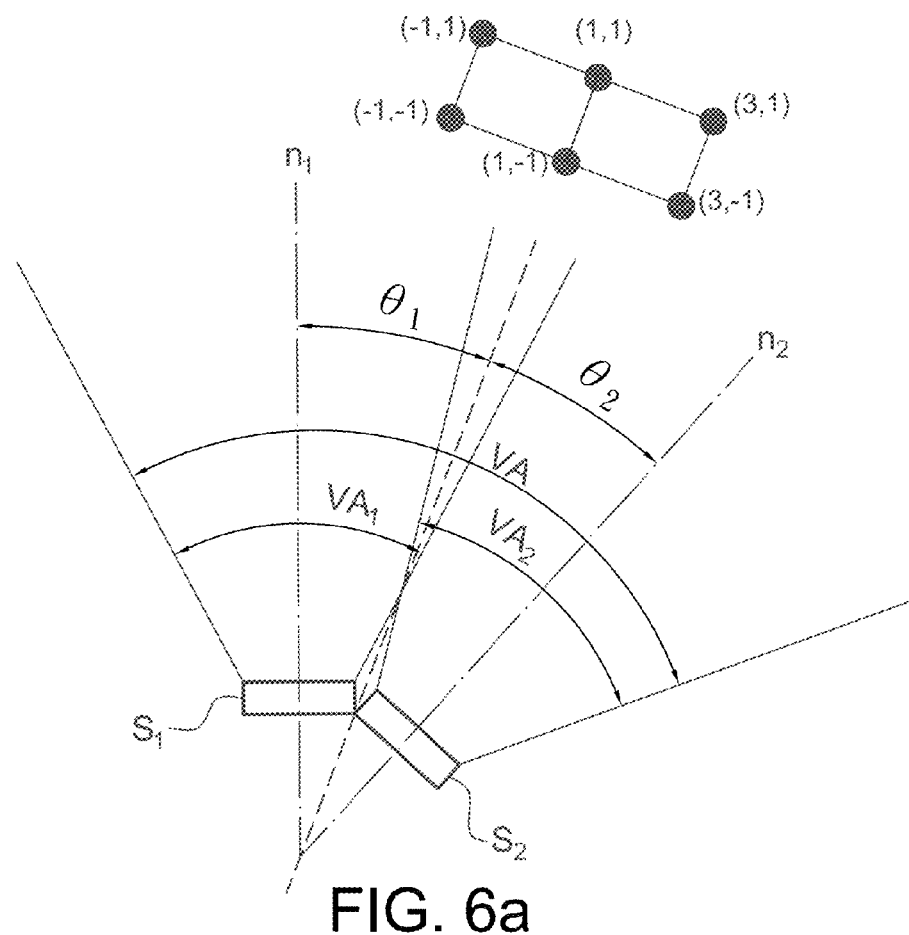
FIG. 6a shows another operational schematic diagram of the calibration mode of the sensor array module with wide angle according to one embodiment of the present invention, wherein the calibration is performed by using six reference points.
Figure 6B:
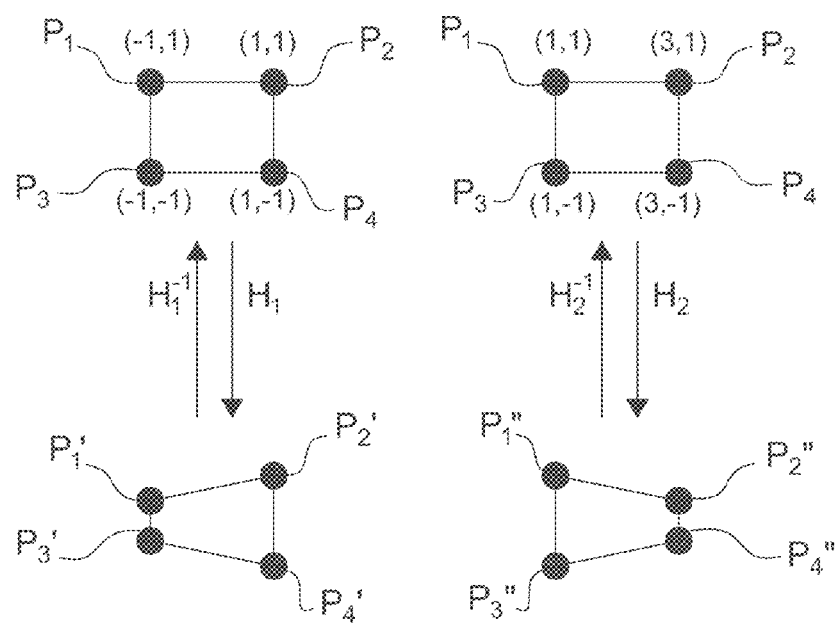
Figure 7A:
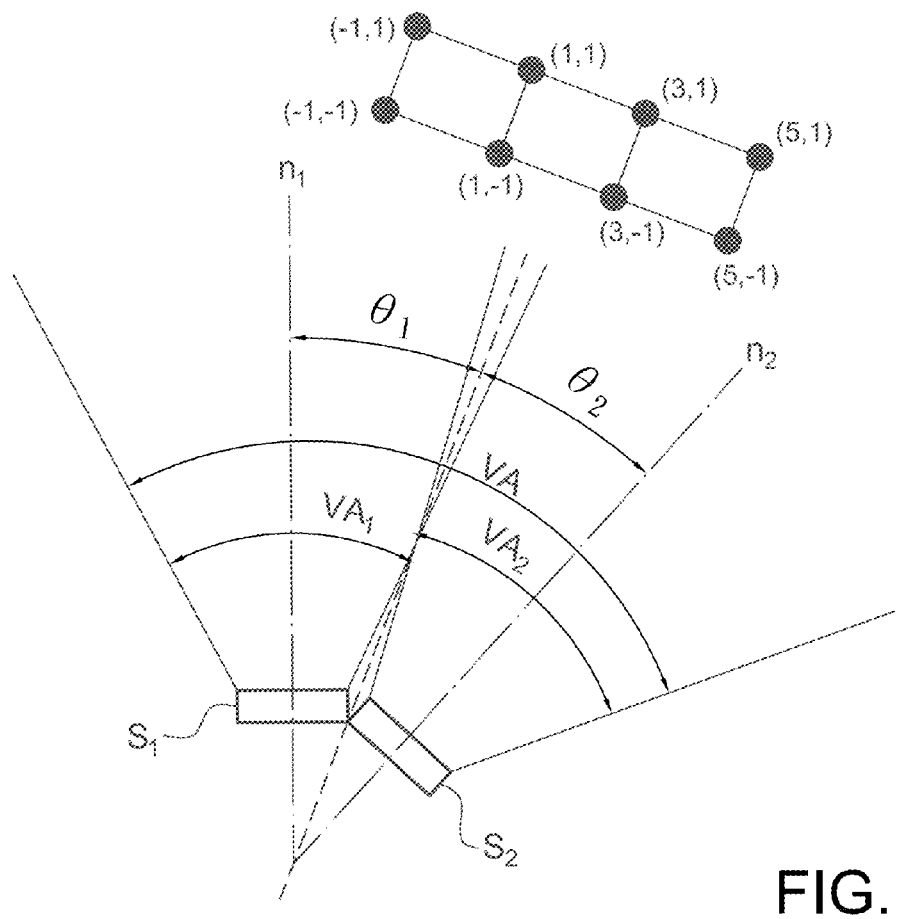
FIG. 7a shows another operational schematic diagram of the calibration mode of the sensor array module with wide angle according to one embodiment of the present invention, wherein the calibration is performed by using eight reference points.
Figure 7B:
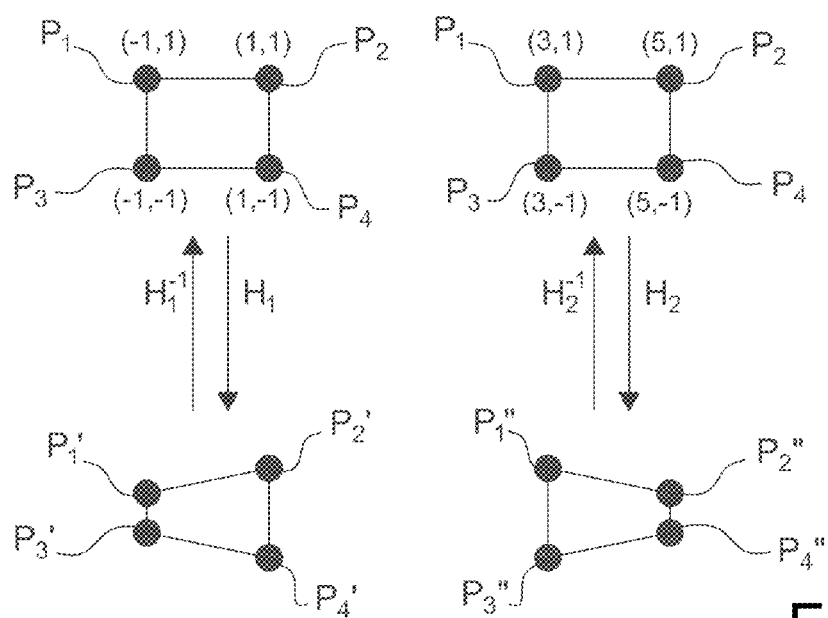

It can be understood that the number of the reference points is not limited to 4. Because it needs at least three reference points to form a reference coordinate system, thus in the present invention, at least three reference points are necessary to be located respectively inside the first field of view $VA_1$ and the second field of view $VA_2$. FIGS. 6a and 6b show an exemplary embodiment of the present invention using six reference points in the calibration mode 31. FIGS. 7a and 7b show another exemplary embodiment of the present invention using eight reference points in the calibration mode 31. Because the calculation of the transformation matrix of these embodiments is similar to that using four reference points, detailed descriptions will not be made herein.

Figure 8A:
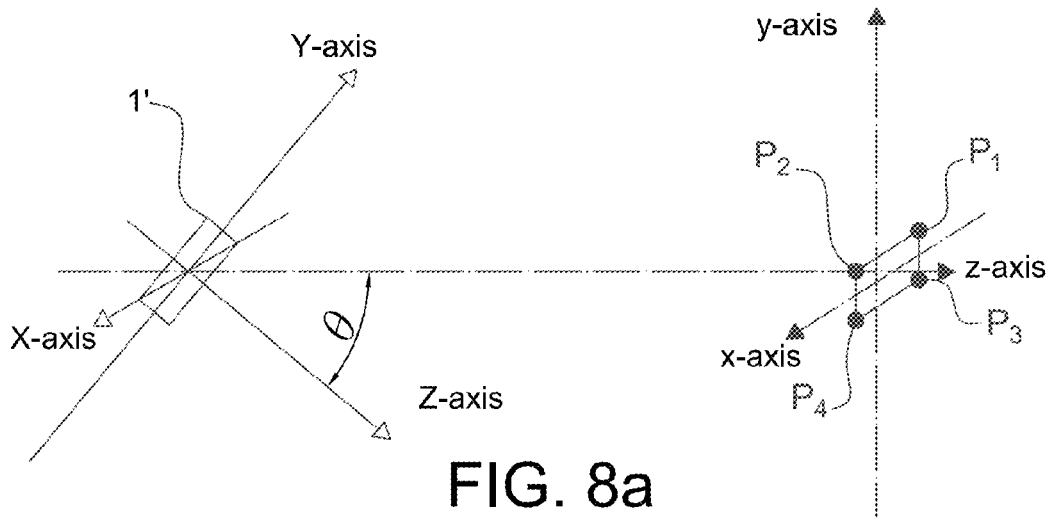
FIG. 8a shows another operational schematic diagram of the calibration mode of the sensor array module with wide angle according to one embodiment of the present invention.
Figure 8B:
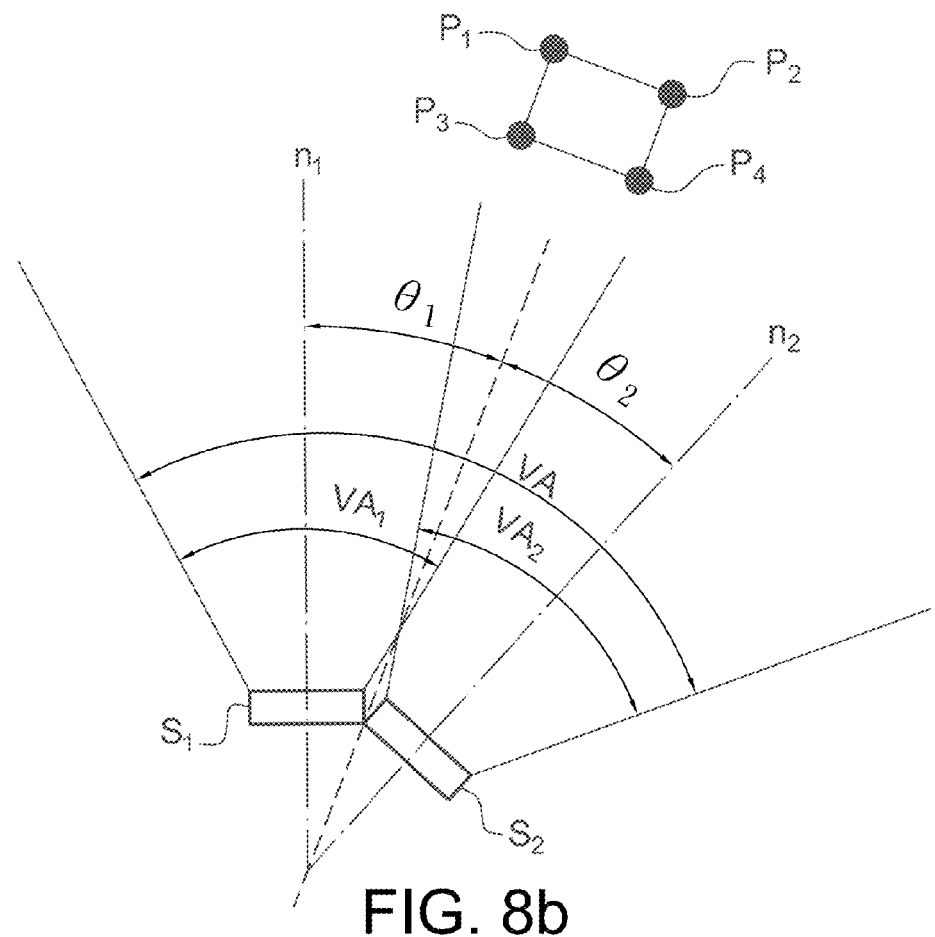

Please refer to FIGS. 8a and 8b, FIG. 8a shows an alternative embodiment of the calibration mode 31 of the present invention; FIG. 8b shows a top view of FIG. 8a. In this alternative embodiment, the sensor array module with wide angle 1' also captures images of four reference points $P_1\sim P_4$ in space to be served as calibration parameters, wherein the reference points $P_1\sim P_4$ are located inside an overlap region of the first field of view $VA_1$ and the second field of view $VA_2$ (step 310). The reference points $P_1\sim P_4$ define a reference coordinate system including x, y, z axes. The sensor array module with wide angle 1' captures images based on a coordinate system including X, Y, Z axes, and the first image sensor and the second image sensor respectively define their own image coordinate systems, e.g. the first image sensor defines a first image coordinate system including $X_1$, $Y_1$, $Z_1$ axes; the second image sensor defines a second image coordinate system including $X_2$, $Y_2$, $Z_2$ axes. In this alternative embodiment, there are a transverse angle difference and a longitudinal angle difference between the first image sensor $S_1$ and the second image sensor $S_2$. For example, there are a first transverse angle difference $\theta_1=-\Phi$ and a longitudinal angle difference $\theta$ between the central normal $n_1(X_1, 0, Z_1)$ of the first image sensor $S_1$ and the z-axis of the reference coordinate system defined by the reference points $P_1\sim P_4$; there are a second transverse angle difference $\theta_2=\Phi$ and a longitudinal angle difference $\theta$ between the central normal $n_2(X_2, 0, Z_2)$ of the second image sensor $S_2$ and the z-axis of the reference coordinate system defined by the reference points $P_1\sim P_4$, wherein the longitudinal angle difference between the central normal $n_1$ of the first image sensor $S_1$ and the z-axis of the reference coordinate system defined by the reference points $P_1\sim P_4$ may not be equal to the longitudinal angle difference between the central normal $n_2$ of the second image sensor $S_2$ and the z-axis of the reference coordinate system defined by the reference points $P_1\sim P_4$.

Figure 9A:
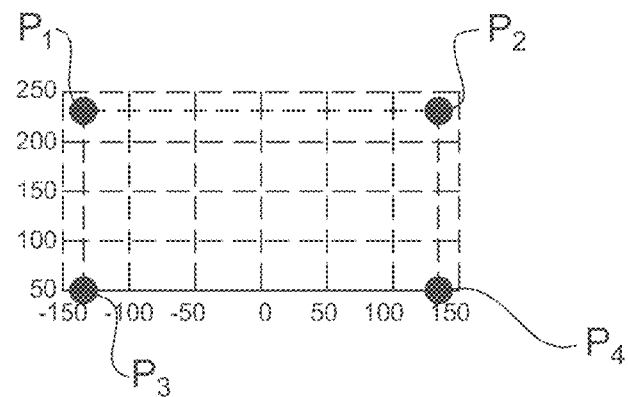
Figure 9B:
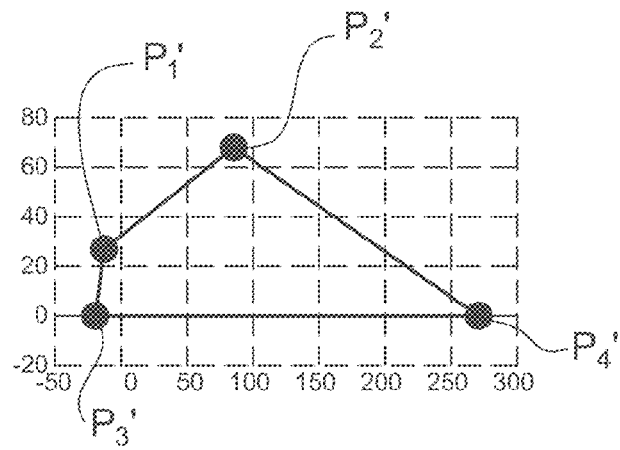
Figure 9C:
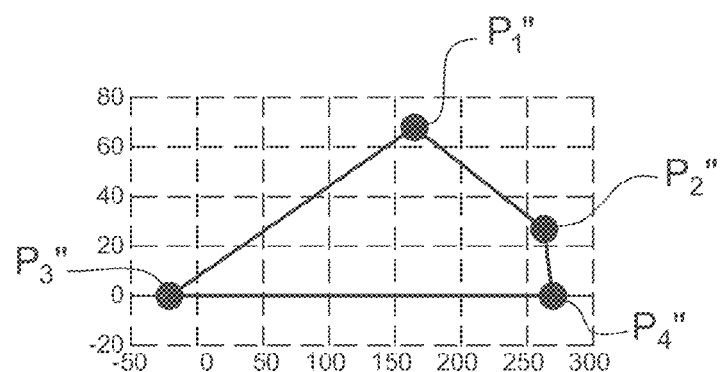

Please refer to FIGS. 9a-9c, FIG. 9a shows reference point images based on the reference coordinate system defined by the reference points $P_1\sim P_4$. FIG. 9b shows reference point images $P_1'\sim P_4'$ captured by the first image sensor $S_1$ based on the first image coordinate system (step 3111), and coordinates of each reference point image in the first image can be obtained (step 3112). Using coordinate transformation, an x-direction transformation matrix $H_{1x}$ and a y-direction transformation matrix $H_{1y}$ between the reference coordinate system and the first image coordinate system can be respectively obtained as equations (5) and (6) (step 3113):

$$H_{1x} = \begin{bmatrix} \cos(-\Phi) & 0 & -\sin(-\Phi) \\ 0 & 1 & 0 \\ \sin(-\Phi) & 0 & \cos(-\Phi) \end{bmatrix} \quad (5)$$

$$H_{1y} = \begin{bmatrix} 1 & 0 & 0 \\ 0 & \cos(\theta) & -\sin(\theta) \\ 0 & \sin(\theta) & \cos(\theta) \end{bmatrix} \quad (6)$$

Then, a transformation matrix $H_1$ between the reference coordinate system and the first image coordinate system can be obtained as equation (7):

$$H_1 = H_{1x} \times H_{1y} \quad (7)$$

$$= \begin{bmatrix} \cos(-\Phi) & -\sin(-\Phi)\sin(\theta) & -\sin(-\Phi)\cos(\theta) \\ 0 & \cos(\theta) & -\sin(\theta) \\ \sin(-\Phi) & \cos(-\Phi)\sin(\theta) & \cos(-\Phi)\cos(\theta) \end{bmatrix}$$

That is, when coordinates of the reference point images based on the reference coordinate system defined by the reference points $P_1\sim P_4$ are already known to be (x, y, z), the coordinates (x, y, z) can be transformed to coordinates based on the first image coordinate system defined by the first image sensor $S_1$ by using the transformation matrix $H_1$ as equation (8):

$$H_1 \times \begin{bmatrix} x \\ y \\ z \end{bmatrix} = \begin{bmatrix} x\cos(-\Phi) - (y\sin(\theta) + z\cos(\theta))\sin(-\Phi) \\ y\cos(\theta) - z\sin(\theta) \\ x\sin(-\Phi) + (y\sin(\theta) + z\cos(\theta))\cos(-\Phi) \end{bmatrix} \quad (8)$$

Similarly, FIG. 9c shows reference point images $P_1''{\sim}P_4''$ captured by the second image sensor $S_2$ based on the second image coordinate system (step 3121), and the coordinates of each reference point image in the second image can be obtained (step 3122). Using coordinate transformation, an x-direction transformation matrix $H_{2x}$ and a y-direction transformation matrix $H_{2y}$ between the reference coordinate system and the second image coordinate system can be respectively obtained as equations (9) and (10) (step 3123):

$$H_{2x} = \begin{bmatrix} \cos(\Phi) & 0 & -\sin(\Phi) \\ 0 & 1 & 0 \\ \sin(\Phi) & 0 & \cos(\Phi) \end{bmatrix} \quad (9)$$

$$H_{2y} = \begin{bmatrix} 1 & 0 & 0 \\ 0 & \cos(\theta) & -\sin(\theta) \\ 0 & \sin(\theta) & \cos(\theta) \end{bmatrix} \quad (10)$$

Then, a transformation matrix $H_2$ between the reference coordinate system and the second image coordinate system can be obtained as equation (11):

$$H_2 = H_{2x} \times H_{2y} \quad (11)$$

$$= \begin{bmatrix} \cos(\Phi) & -\sin(\Phi)\sin(\theta) & -\sin(\Phi)\cos(\theta) \\ 0 & \cos(\theta) & -\sin(\theta) \\ \sin(\Phi) & \cos(\Phi)\sin(\theta) & \cos(\Phi)\cos(\theta) \end{bmatrix}$$

That is, when the coordinates of the reference point images based on the reference coordinate system defined by the reference points $P_1{\sim}P_4$ are already known to be (x, y, z), the coordinates (x, y, z) can be transformed to coordinates based on the second image coordinate system defined by the second image sensor $S_2$ by using the transformation matrix $H_2$ as equation (12):

$$H_2 \times \begin{bmatrix} x \\ y \\ z \end{bmatrix} = \begin{bmatrix} x\cos(\Phi) - (y\sin(\theta) + z\cos(\theta))\sin(\Phi) \\ y\cos(\theta) - z\sin(\theta) \\ x\sin(\Phi) + (y\sin(\theta) + z\cos(\theta))\cos(\Phi) \end{bmatrix} \quad (12)$$

In addition, when the relative spatial relationship between image sensors is not known, the first transformation matrix $H_1$ can still be obtained according to equation (8) by using coordinates of the reference point images $P_1'{\sim}P_4'$ captured by the first image sensor $S_1$ and predefined coordinates of the reference point images $P_1{\sim}P_4$, e.g. (x, y, z). Similarly, the second transformation matrix $H_2$ can also be obtained according to equation (12) by using coordinates of the reference point images $P_1''{\sim}P_4''$ captured by the second image sensor $S_2$ and predefined coordinates of the reference point images $P_1{\sim}P_4$.

The transformation matrices $H_1$, $H_2$ and the virtual plane obtained after the execution of the operation mode 31 will then be stored, in advance, in the storage unit 22 of the image processing unit 2 for being used by the processer 21 in the operation mode 32.

In an alternative embodiment, the first image sensor $S_1$ and the second image sensor $S_2$ can be mounted on a preformed frame (not shown); therefore, when the first image sensor $S_1$ and the second image sensor $S_2$ are assembled on the frame, the relative spatial relationship between the first image sensor $S_1$ and the second image sensor $S_2$ is already known. For example, a transverse angle difference and/or a longitudinal angle difference between a central normal of the first image sensor $S_1$ and a central normal of the second image sensor $S_2$ can be known in advance. Thus, in the calibration mode 31 of this alternative embodiment, it is not necessary to respectively dispose at lease three reference points inside field of views of the first image sensor $S_1$ and the second image sensor $S_2$. It is able to calculate the transformation matrix directly from the relative spatial relationship between image sensors and to obtain a virtual plane by using the transformation matrix. Finally, the transformation matrix and the virtual plane will be stored in the storage unit 22. Herein, the virtual plane can be based on the first image coordinate system defined by the first image sensor $S_1$ (i.e. images captured by the second image sensor $S_2$ can be transformed to the first image coordinate system through the transformation matrix); or can be based on the second image coordinate system defined by the second image sensor $S_2$ (i.e. images captured by the first image sensor $S_1$ can be transformed to the second image coordinate system through the transformation matrix).

Please refer to FIG. 2 again, as already mentioned above, the calibration mode 31 is a calibrating process performed before the sensor array module with wide angle 1 and 1' leave the factory or when they are used for the first time. In actual operating stage (operation mode 32), it is not necessary to repeat the calibration mode 31. Detailed descriptions of the operation mode 32 will be described hereinafter.

Figure 10A:
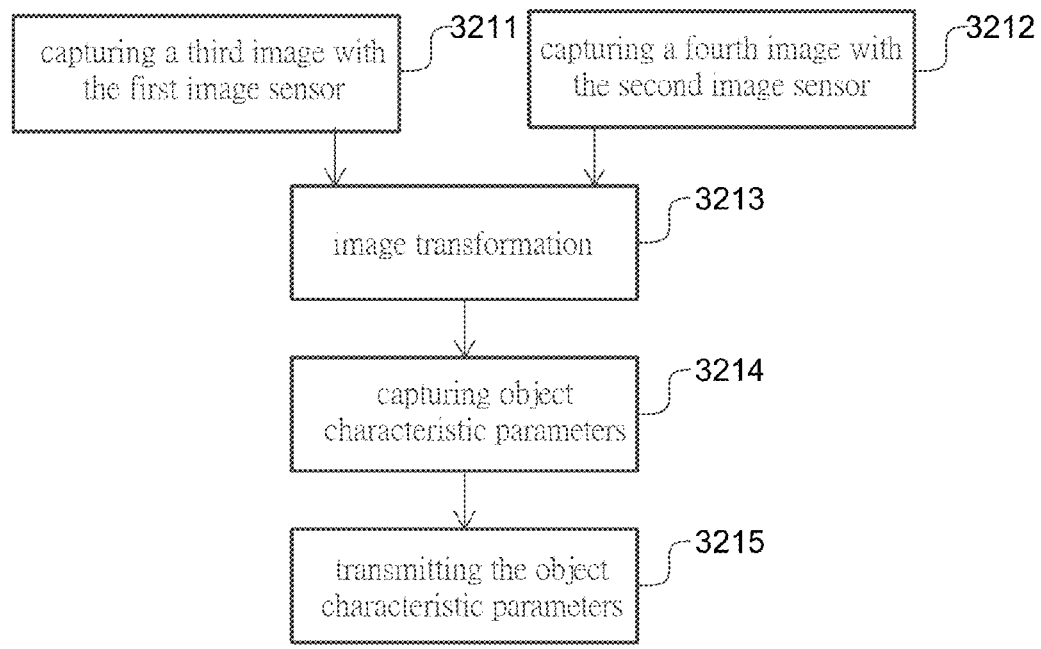
FIG. 10a shows a flow chart of the operation mode of the sensor array module with wide angle according to one embodiment of the present invention.
Figure 10B:
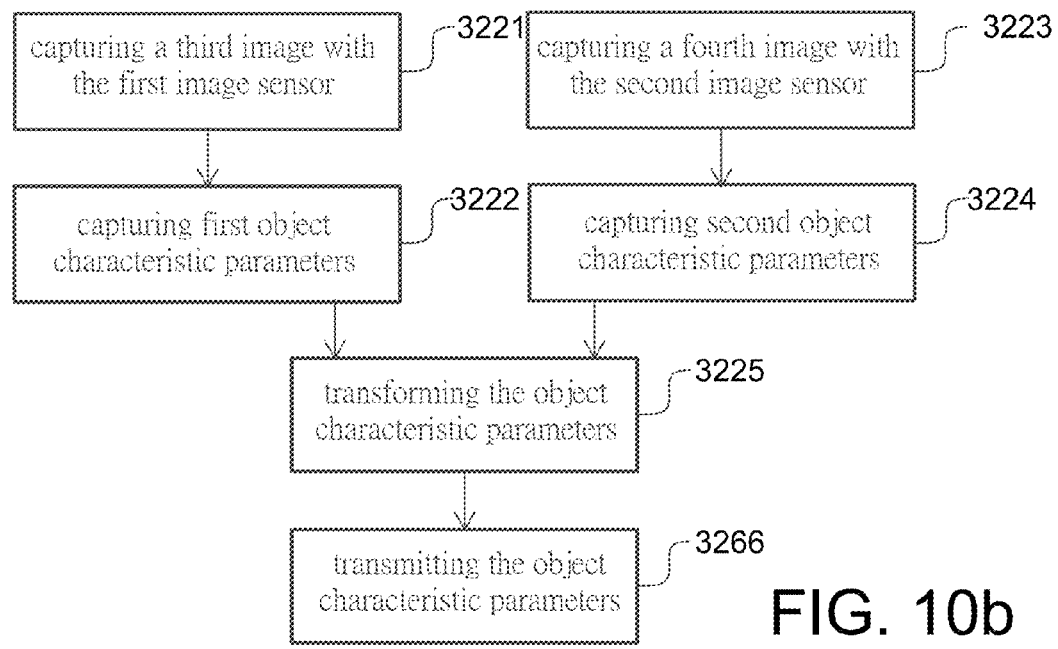
FIG. 10b shows a flow chart of the operation mode of the sensor array module with wide angle according to another embodiment of the present invention.

Please refer to FIG. 10a, it shows a flow chart of the operation mode 32 of the sensor array module with wide angle 1 and 1' according to one embodiment of the present invention. The operation mode 32 includes the steps of: capturing a third image with the first image sensor (step 3211); capturing a fourth image with the second image sensor (step 3212); transforming the third image and/or the fourth image to a virtual plane by using the transformation matrix (step 3213); capturing at least one characteristic parameter of object images in the virtual plane (step 3214); and transmitting the characteristic parameter (step 3215).

Please refer to FIGS. 10a and 11a-11d, the operation mode 32 of the sensor array module with wide angle 1 and 1' will be described by using an application embodiment. Herein, the sensor array module with wide angle 1' is applied in a pointer positioning system, and light sources $T_3$ and $T_4$, such as the sight of a light gun or a pointing device, are respectively located inside a first field of view $VA_1$ of the first image sensor $S_1$ and a second field of view $VA_2$ of the second image sensor $S_2$. First, use the first image sensor $S_1$ to capture a third image $I_3$ (step 3211) and use the second image sensor $S_2$ to capture a fourth image $I_4$ (step 3212). Then, the processor 21 uses the transformation matrix pre-stored in the storage unit 22, e.g. transformation matrices $H_1$ and $H_2$ obtained in the calibration mode 31, to transform the third image $I_3$ and the fourth image $I_4$ to a virtual plane to produce a composite image CI which has a composite field of view VA. As mentioned above, the virtual plane can be based on either a coordinate system defined by the third image $I_3$ or the fourth image $I_4$. Then the processor 21 captures characteristic parameters of object images, such as images of the light sources $T_3$ and $T_4$, in the composite image CI, such as parameters of coordinates, areas, colors, directivities, boundaries, number of vertices and aspect ratios of object images (step 3214). Finally, the characteristic parameters will be transmitted to an image display device or a storage device (not shown) through the transmission interface unit 23, wherein the image display device may be a TV screen, a projective screen, a game machine screen or a computer screen. The image display device is used to display a picture generated from an application, control the application and update the picture based on the characteristic parameters of object images, such as coordinates and parameters of the images of the light sources $T_3$ and $T_4$.

Figure 11A:
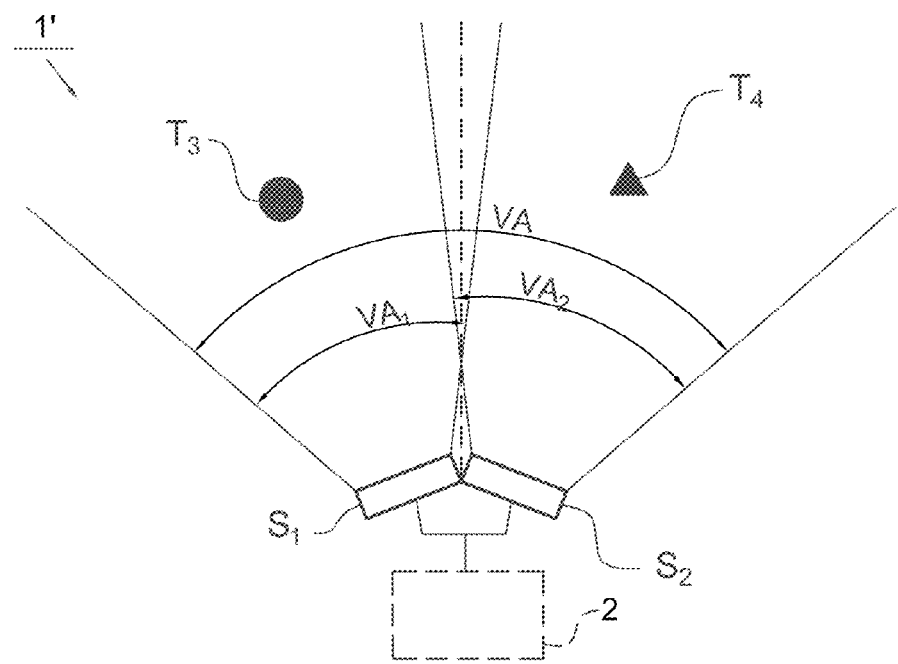
FIG. 11a shows a schematic diagram of an application of the operation mode of the sensor array module with wide angle according to one embodiment of the present invention.
Figure 11B:
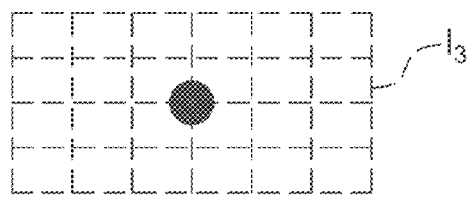
Figure 11C:
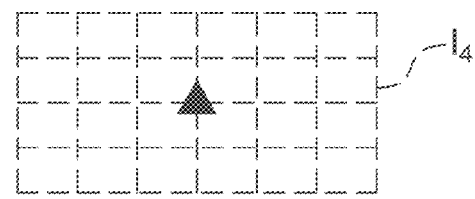
Figure 11D:
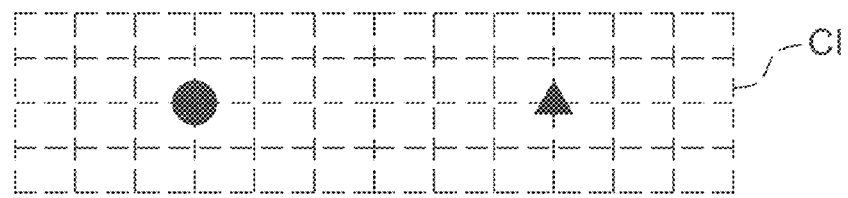

Please refer to FIGS. 10*b* and 11*a*-11*d*, an alternative embodiment of the operation mode 32 of the sensor array module with wide angle 1 and 1' will be described hereinafter. The operation mode 32 includes the steps of: capturing a third image with the first image sensor (step 3221); capturing a first characteristic parameter of object images in the third image (step 3222); capturing a fourth image with the second image sensor (step 3223); capturing a second characteristic parameter of object images in the fourth image (step 3224); transforming the first characteristic parameter and the second characteristic parameter to a virtual plane by using the transformation matrix (step 3226); and transmitting the characteristic parameters (step 3215). The difference between this embodiment and FIG. 10*a* is that, after the third and fourth images are captured, the processer 11 first captures characteristic parameters of objects in images respectively, and then transforms the characteristic parameters to the virtual plane to form composite characteristic parameters by using the transformation matrix stored in the storage unit 22. Finally, as described above, the characteristic parameters are transmitted to an image display device or a storage device through the transmission interface unit 23. Therefore, the image display device can be used to control the application and update the picture based on the composite characteristic parameters, such as coordinates and parameters of the images of the light sources $T_3$ and $T_4$. In this manner, by disposing at least two image sensors in the sensor array module with wide angle 1 and 1', the field of view of a pointer positioning system can be increased significantly (as shown in FIG. 11*d*).

Figure 12:
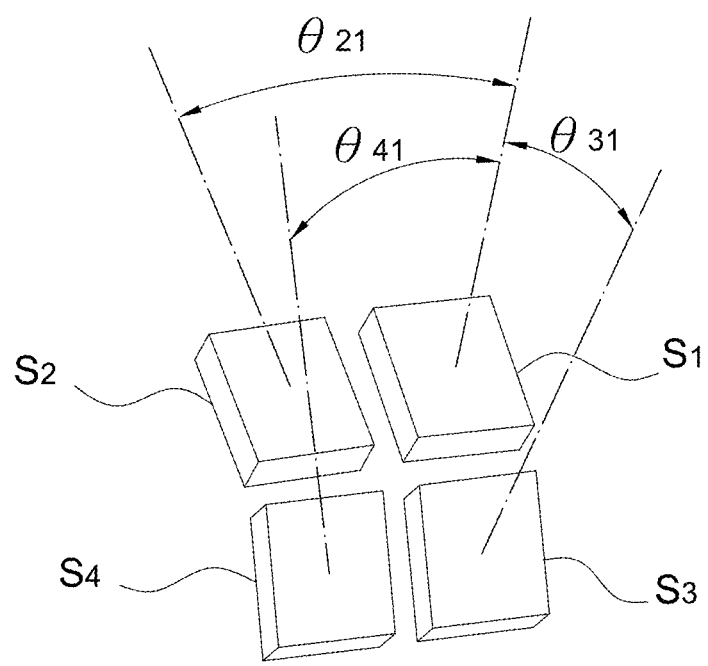
FIG. 12 shows a schematic diagram of the sensor array module with wide angle according to an alternative embodiment of the present invention.

In addition, the present invention also can utilize the methods mentioned above to combine images captured by more than two image sensors to create a composite image. For example, please referring to FIG. 12, it shows an embodiment in which four image sensors $S_1$-$S_4$ are arranged in a matrix, wherein an angle difference $\theta_{21}$ is between the image sensor $S_2$ and the image sensor $S_1$; an angle difference $\theta_{31}$ is between the image sensor $S_3$ and the image sensor $S_1$ an angle difference $\theta_{41}$ is between the image sensor $S_4$ and the image sensor $S_1$. In thin manner, it is able to calculate transformation matrices between the image sensors $S_2$-$S_4$ and the image sensor $S_1$ according to those spatial relationships and to combine images captured by the image sensors $S_1$-$S_4$ to create a composite image by using the methods mentioned in the above paragraphs. It also could be understood that, in the present invention the number of the image sensor is not limited to four, and a suitable number of image sensors and their relative spatial relationships can be designed according to different requirements.

As mentioned above, since the field of view of an image sensor module can be increased by using a plurality of image sensors, how to correctly combine a plurality of images has become an important issue. Therefore, the present invention provides a sensor array module with wide angle and a calibration method as well as an operation method for the same. By storing, in advance, at least one transformation matrix in the sensor array module with wide angle, images can be correctly combined by using the transformation matrix during operation. In addition, the sensor array module with wide angle of the present invention can be applied in a pointer positioning system, e.g. a shooting game, such that the field of view of the pointer positioning system during operation can be significantly increased and the system cost can also be reduced.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An image calibration method for a sensor array module with wide angle, the sensor array module comprising a first image sensor and a second image sensor, the image calibration method comprising:
   determining a relative spatial relationship between the first image sensor and the second image sensor;
   obtaining at least one transformation matrix according to the relative spatial relationship; and
   transforming images captured by the first image sensor and/or images captured by the second image sensor to a virtual plane by using the transformation matrix,
   wherein the relative spatial relationship is at least one of a transverse angle and a longitudinal angle between the first image sensor and the second image sensor.

2. The image calibration method as claimed in claim 1, wherein the virtual plane is based on a coordinate system defined by the first image sensor or a coordinate system defined by the second image sensor.

3. The image calibration method as claimed in claim 1, wherein a field of view of the first image sensor is overlapped with a field of view of the second image sensor.

4. The image calibration method as claimed in claim 1, wherein a field of view of the first image sensor is non-overlapped with a field of view of the second image sensor.

5. An operation method for a sensor array module with wide angle, the sensor array module comprising a first image sensor, a second image sensor and a storage unit storing at least one transformation matrix obtained according to a relative spatial relationship between the first image sensor and the second image sensor, the operation method comprising:
   capturing a third image with the first image sensor;
   capturing a fourth image with the second image sensor;
   transforming the third image and/or the fourth image to a virtual plane by using the transformation matrix; and
   capturing at least one characteristic parameter of object images in the virtual plane,
   wherein the relative spatial relationship between the first image sensor and the second image sensor is at least one of a transverse angle and a longitudinal angle between the first image sensor and the second image sensor.

6. The operation method as claimed in claim 5, wherein the characteristic parameter is selected from the group consisting of coordinates, areas, colors, directivities, boundaries, numbers of vertices, and aspect ratios of the object images.

7. An operation method for a sensor array module with wide angle, the sensor array module comprising a first image sensor, a second image sensor and a storage unit storing at least one transformation matrix obtained according to a relative spatial relationship between the first image sensor and the second image sensor, the operation method comprising:
   capturing a third image with the first image sensor;
   generating a first characteristic parameter according to the third image;
   capturing a fourth image with the second image sensor;

generating a second characteristic parameter according to the fourth image; and transforming the first characteristic parameter and the second characteristic parameter to a virtual plane by using the transformation matrix whereby combining the first characteristic parameter and the second characteristic parameter, wherein the relative spatial relationship between the first image sensor and the second sensor is at least one of a transverse angle and a longitudinal angle between the first image sensor and the second image sensor.

8. The operation method as claimed in claim 7, wherein the first and the second characteristic parameters are selected from the group consisting of coordinates, areas, colors, directivities, boundaries, numbers of vertices, and aspect ratios of the object images.

* * * * *